United States Patent Office 3,519,240
Patented July 7, 1970

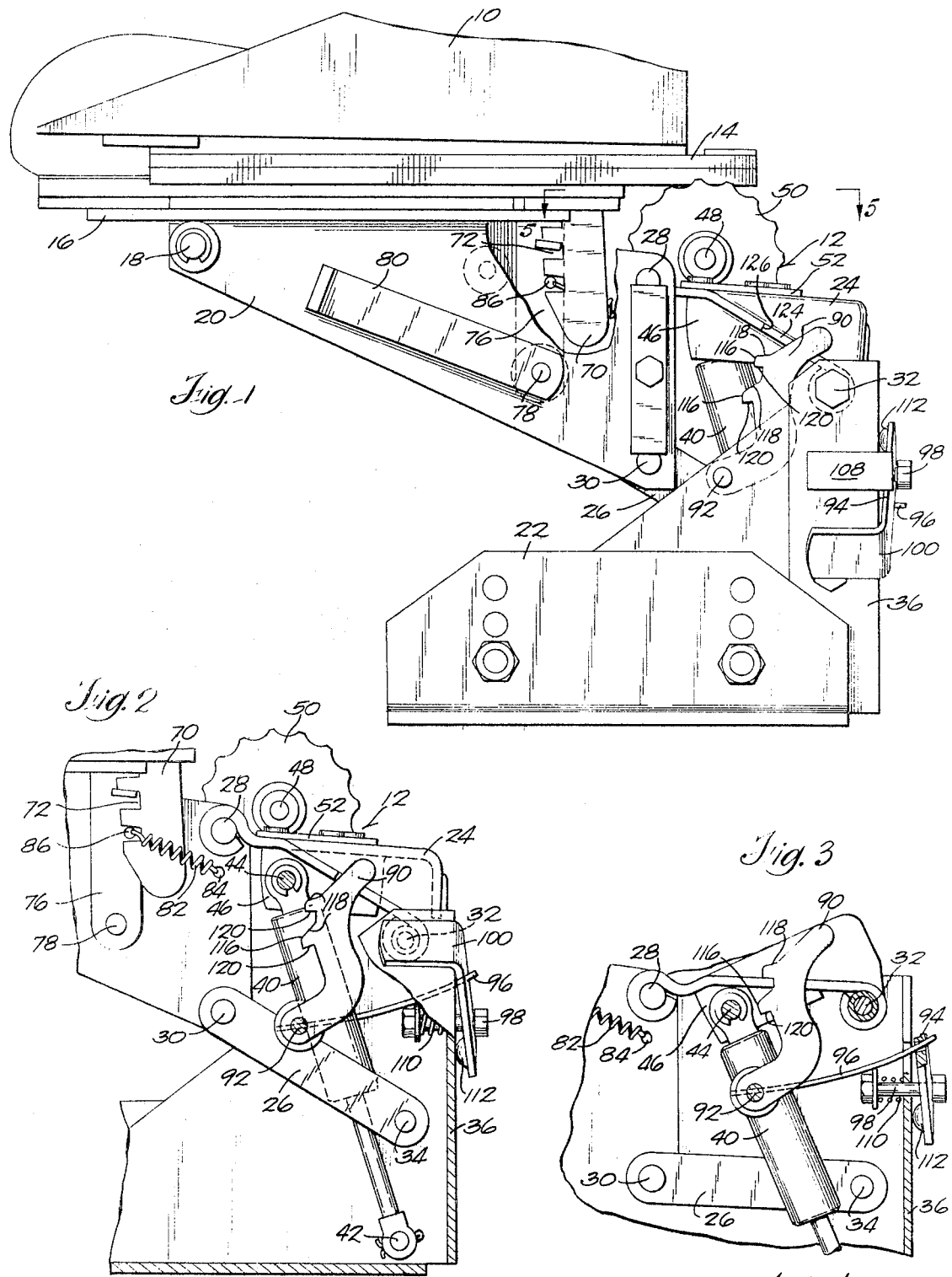

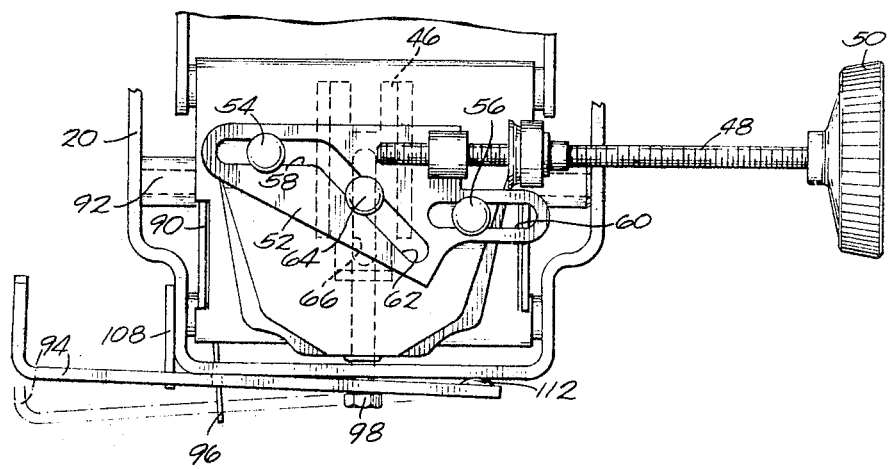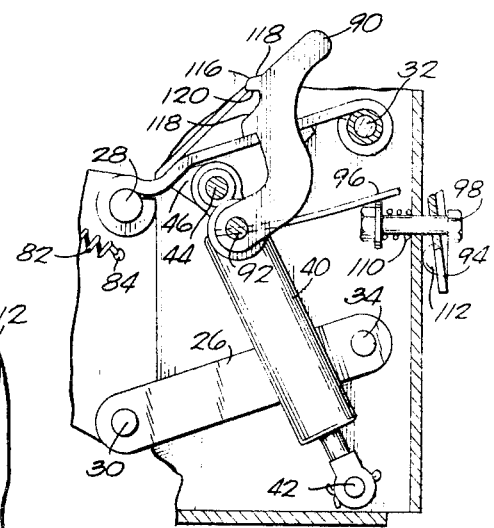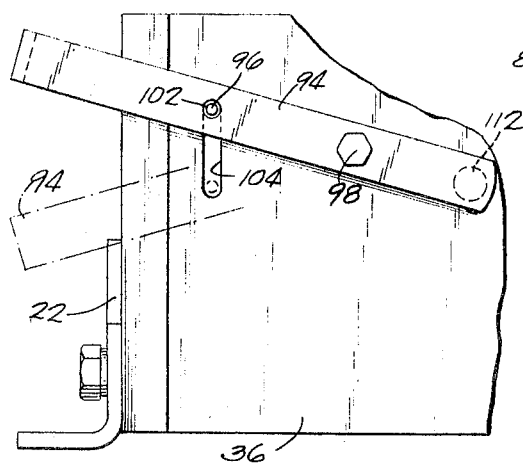

3,519,240
SEAT SUSPENSION
Richard F. Swenson, Milwaukee, Wis., assignor to Swenson Corporation, Redgranite, Wis., a corporation of Wisconsin
Filed Sept. 27, 1968, Ser. No. 763,202
Int. Cl. B60n 1/02
U.S. Cl. 248—399                         3 Claims

ABSTRACT OF THE DISCLOSURE

A resilient vehicle seat suspension embodying means for selectively limiting the amount of movement imparted to the seat through the resilient support independently of the customary adjusting mechanisms.

BACKGROUND

Various types of seat suspensions have heretofore been proposed for use on vehicles such as tractors, bulldozers, front-end loaders, and the like which are subjected to especially rough riding conditions and rather violent shocks. These seat suspensions have embodied a variety of resilient cushioning and shock absorbing supports for the seat in efforts to give the operator as smooth and comfortable a ride as possible.

In many of the most commonly used and widely accepted seat suspensions an arrangement of parallel links is employed for supporting the seat, the links being adapted to swing downwardly under the weight of an operator with the downward movement being resisted by a spring arrangement of one type or another. It is also common practice to utilize torsional elements or the like for resisting swinging of the seat supporting links, and adjustment means may be provided for varying the resistance to movement proportionately to the weight of the operator or to accommodate for certain operating conditions. Means have also been heretofore provided for adjusting the heighth and/or tilt of the seat to suit the operator.

However, in many types of vehicle operations, the conditions are extremely variable. Therefore, even though the seat may have been adjusted to the operator's desires for normal usage, changing conditions may require that such adjustments be rapidly altered for the operator's convenience and safety. For example, the operator of a bulldozer or front-end loader may effect adjustments in the "hardness" or "softness" of ride as well as the heighth of the seat to meet his requirements for comfort and convenience in normal operation or for "over-the-road" travel of the vehicle. Yet, when these vehicles are being loaded or unloaded or operated over extremely rough terrain, these adjustments may prove uncomfortable or even dangerous to the operator due to the abnormal jolting or bouncing resulting from the resiliency of the seat suspension or support.

SUMMARY

It is therefore an object of the present invention to provide an improved seat suspension which embodies means for readily locking out the resilient seat supporting or cushioning mechanism in a quick and easy manner under certain operating conditions of the vehicle.

Another object of this invention is to provide an improved seat suspension which includes means for effecting customary adjustments in seat heighth and quality of ride along with means for selectively rendering such normal adjustments periodically ineffective whenever desired without disturbing the adjustments.

Still another object of the invention is to provide an improved vehicle seat suspension embodying readily operable mechanism for locking out the normally effective resilient seat support to restrict movement of the seat within a plurality of predefined limits.

A further object of the present invention is to provide an improved seat suspension comprising, linkage arranged to guide a seat within a normal range of movement, resilient means connected with said linkage for resiliently supporting said seat in its normal range of movement, and means cooperable with said linkage to limit the extent of movement of said seat and restrict the effectiveness of said resilient supporting means at the will of an operator.

These and other objects and advantages of the invention will become apparent from the following detailed description.

THE DRAWINGS

A clear conception of the features constituting the present improvements, and of the construction and mode of operation of a typical vehicle seat suspension embodying the invention, may be had by referring to the drawings accompanying and forming a part of this specification wherein like reference characters designate the same or similar parts in the several views.

FIG. 1 is a side elevational view of a typical vehicle seat suspension embodying the invention and showing the lockout lever swung to unlock position wherein the lockout latch is disengaged and ineffective to limit or restrict normal seat movement;

FIG. 2 is a fragmentary side elevation similar to FIG. 1 but showing the lockout lever swung to lock position and with the lockout latch still disengaged, parts being broken away for the sake of clarity;

FIG. 3 is a similar fragmentary side elevation with the lockout lever still in lock position but with the lockout latch engaged in an intermediate locking position;

FIG. 4 is a view similar to FIG. 3 but with the lockout latch engaged in its lowermost notch;

FIG. 5 is a fragmentary view taken generally along the line 5—5 of FIG. 1 and with the movement of the lockout lever depicted by means of broken lines and parts broken away from the sake of clarity; and FIG. 6 is a fragmentary rear view of the suspension with the movement of the lockout lever again depicted by broken lines and parts broken away for clarity.

DETAILED DESCRIPTION

While the improvements constituting the present invention have been shown and described herein as being advantageously embodied in a seat suspension having a particular quadrilateral linkage arrangement for guiding the seat and a gas spring cooperating therewith to provide the resilient means for supporting the seat in its movement, it is not intended or desired to unnecessarily restrict or limit the invention by reason of such embodiment since the improvements can be used to advantage in seat suspensions having other forms of guiding linkages and resilient supports. It is also contemplated that certain descriptive terminology used herein shall be given the broadest possible interpretation consistent with the disclosure.

Referring now particularly to FIG. 1 of the drawings, a vehicle seat 10 is shown as being supported on the seat suspension 12 which, in turn, may be attached to the platform of a vehicle such as a tractor, bulldozer, front-end loader or the like. The seat 10 is carried in a suitable manner on laterally spaced rails 14 or the like attached to a tiltable seat supporting member 16 for adjustment therealong forwardly and rearwardly to different selected fore and aft positions. The seat supporting member 16 is, in turn, pivotally attached as at 18 to an upper frame member 20 which thereby provides the seat support.

The upper frame member 20 is interconnected to a lower frame member or base 22 as by means of a parallelogram or quadrilateral linkage formed by vertically spaced upper and lower links 24, 26 respectively. The forward ends of the upper and lower links are pivotally attached to the upper frame member 20 by means of pivots 28, 30 respectively, and the rear ends of the links 24, 26 are pivotally secured at 32, 34 respectively to a riser 36 firmly secured to or forming an integral part of the base 22. Thus, the quadrilateral linkage formed by the frame member 20, upper and lower links 24, 26 and base riser 36 is adapted to guide the seat 10 within a normal range of substantially vertical movement.

Secured between the base 22 adjacent the rear riser 36 and the upper link 24 is a gas spring 40 which provides a resilient support for the seat. The lower end of the gas spring 40 is pivotally mounted as at 42 for swinging movement, and the upper end of the gas spring is pivotally secured as at 44 to a bracket 46 which is adjustable forwardly and rearwardly along the upper link 24 to vary the angle of the gas spring and permit adjustments in the effectiveness thereof. Thus, the riding quality imparted to the seat through the resilient support afforded by the gas spring 40 may be varied by adjusting the position of the bracket 46 along the link 24 to obtain a harder or softer ride.

These adjustments in the position of the bracket 46 and, consequently, the angularity of the gas spring 40 may be conveniently effected as by means of a threaded adjustment shaft 48 having a manipulating knob 50. As shown in FIG. 5, the threaded shaft 48 is cooperable with a slide plate 52 guided for movement longitudinally of the adjustment shaft 48 and transversely across the upper link 24 by means of pins 54, 56 extending through parellel slots 58, 60 respectively, formed in the plate 52. The plate 52 is also provided with a slot 62 angularly inclined with respect to slots 50, 60, and a pin 64 extends through the slot 62 and through a slot 66 in the link 24 and is fastened to bracket 46, the slot 66 being perpendicular to the slots 58, 60 so that the bracket 46 which carries the upper end of the gas spring through pivot 44 moves fore and aft upon rotation of the adjustment shaft 48. This enables adjustment in the hardness of softness of the ride through the gas spring 40.

The tilt imparted to the seat 10 may also be rendered adjustable relative to the upper frame member 20 in a convenient manner. As shown, the seat support member 16 may be provided with a depending strap or adjustment post 70 having a series of spaced notches 72 adapted to be selectively engaged by a latching finger on a lever arm 76 swingable about a pivot 78 by means of a latch handle 80. To urge the latch toward the strip 70 and normally maintain the same in engagement with the selected notch 72 of the strap, a spring 82 is provided, one end of the spring 82 being secured as at 84 to a fixed point on the upper frame member 20 and the other end of the spring being secured as at 86 to the swingable lever arm 76. Thus, by adjusting the tilt latch, as provided by the lever arm 76 and depending strap 70, by means of the latch handle arm 80, the angularity or tilt of the seat supporting member 16 and the seat 10 carried thereby may be readily adjusted.

In accordance with the present invention, mechanism is provided for, in effect, locking out the resilient seat supporting means so as to limit the extent of movement of the seat and restrict the effectiveness of the resilient supporting means at the will of an operator. Such so-called lock-out mechanism comprises, in general, a latch member 90 swingable about a lower pivot 92 by means of a lever 94, the lever 94 being connected to the latch member 90 through a resilient link or arm 96.

In the arrangement shown, the lock-out lever 94 is pivotally mounted at 98 to the rear wall of the riser 36 and has a manipulating portion 100 extending forwardly along one side of the riser within easy reach of the operator. The lever 94 is provided with an aperture 102 located between the pivot 98 and manipulating portion 100, and the resilient link or arm 96 is shown as being in the nature of a heavy spring steel music wire or the like having one end thereof extending through the pivot pin 92 with the other end extending through the aperture 102 in the lever 94, the wire 96 being movable by the lever 94 through a vertical slot 104 formed in the rear wall of the riser 36.

While the design of the lock-out lever 94 and its operative connection with the pivotally mounted latch 90 may be varied, it has been found convenient to form this lever as shown herein. In the embodiment shown, the lever 94 is carried by the pivot pin 98 as aforesaid, and to aid in positively positioning the same either in effective locking position wherein the manipulating portion 100 is in its uppermost position, or in unlocked position wherein the portion 100 is in its lowermost position, a positioning abutment 108 is provided as by securing a strap in a convenient manner to the riser 36 with a rearwardly protruding portion of the strap providing the abutment. In turn, the outer swinging end of lever 94 is resiliently urged toward the adjacent wall of the riser 36 as by means of a coil spring 110 compressed between the inner end of the pivot 98 and the rear wall of the riser 36, and the opposite end of the lever beyond the pivot 98 is preferably provided with a button or head 112 adapted to ride over the outer face of the rear wall of the riser 36. Thus, in order to swing the lever 94 from one position to another, it is necessary for the operator to first move the end portion 100 rearwardly to overcome the action of the spring 110 and to then swing the same either to its lowermost unlocked position or its uppermost locked position.

The latch member 90 may conveniently be formed of generally S-shape as shown with one or more ratchet type teeth 116 formed on its forward edge. The teeth 116 are each shaped with an inclined entry edge 118 and with a lower abutment or locking edge 120, and the upper link 24 is preferably in the form of a plate having a marginal elongated notch 124 cut in its side edge portion to accommodate the upper end of the latch 90. Thus, with the lever 94 swung in a counterclockwise direction so as to abut the lower protruding edge of the stop 108, the latch member 90 is swung in a clockwise direction and rides freely within the notched marginal portion 124 of the upper link 24 without in any way interfering with the normal action of the gas spring 40 and without restricting movement of the seat 10.

However, when the lever 94 is moved across the abutment 108 in a clockwise direction so as to abut the upper portion of the positioning stop 108, the toothed latch member 90 is swung in a counterclockwise direction. Thus, when the link 24 is swung downwardly or counterclockwise by reason of the weight imposed on the seat 10, the forward end 126 of the notch 124 will ride over the inclined edge 118 of the initial tooth 116 until it clears the tooth. Since the member 90 is being resiliently urged in a counterclockwise direction or toward locking position by the wire 96, the forward edge 126 of the notched portion 124 will automatically be engaged by the flat locking portion 120 of the tooth 116 after the link passes the entry portion of the tooth. The link 24 will thus be the latch member 90 against upward movement, and the effectiveness of the gas spring is accordingly restricted. Upon imposition of a greater weight on the seat, the gas spring will be further compressed and the link 24 will continue its counterclockwise movement until the abutment edge 120 of the next succeeding tooth 116 is engaged which will further limit the extent of movement of the seat and the effectiveness of the gas spring 40.

It is thus apparent that the lock-out mechanism afforded by the toothed latch 90, together with its operating lever 94 and the resilient arm 96, is operable and is effective independently of any of the other adjusting mechanisms to limit upward movement of the seat and restrict the effectiveness of the resilient supporting means for the seat so as to eliminate the normal bounce and thereby stabilize the seat when desired. It is also believed apparent that the latch 90 becomes automatically effective to engage the upper link 24 when sufficient load is imposed on the seat to swing the link 24 to a point where it is engaged by one or the other of the teeth 116, and such load is dependent on the weight of the operator and the amount of downward thrust placed on the seat 10 and its supporting elements. Thus, an operator can anticipate the possible need for locking out the resilient seat support and can swing the lockout lever 94 to locking position, but until an adequate load is placed on the seat to swing the upper link 24 past the first tooth of the latch 90, the resilient suspension will not be affected. However, when the load is sufficient to call for lockout of the resilient support, the latch will automatically engage.

Various modes of carrying out the invention are contemplated as being within the scope of the following claims particularly pointing out and distinctly claiming the subject matter which is regarded as the invention.

I claim:

1. A seat suspension comprising, linkage arranged to guide a seat within a normal range of movement, resilient means connected with said linkage for resiliently supporting said seat in its normal range of movement, and means cooperable with said linkage to prevent upward movement of said seat and render the said resilient supporting means inoperative in the upward direction at the will of an operator, said cooperable means including an operating lever and a latch which is cooperable with the linkage upon movement of said lever to a selected position, said latch having a plurality of spaced notches cooperable with the linkage.

2. A seat suspension according to claim 1, wherein the operating lever is connected to the latch by a resilient arm.

3. A seat suspension comprising, linkage arranged to guide a seat within a normal range of movement, resilient means connected with said linkage for resiliently supporting said seat in its normal range of movement, and means cooperable with said linkage to prevent upward movement of said seat and render the said resilient supporting means inoperative in the upward direction at the will of an operator, said cooperable means including an operating lever and a latch which is cooperable with the linkage upon movement of said lever to a selected position, said latch being connected with its operating lever by means of a resilient arm, and the latch has at least one notch for engaging the upper link when the latch is moved to its effective locking position by the actuating lever.

References Cited

UNITED STATES PATENTS

| | | | |
|---|---|---|---|
| 3,049,330 | 8/1962 | Coons et al. | 248—419 |
| 3,061,260 | 10/1962 | Simons et al. | 248—399 |
| 3,085,778 | 4/1963 | Korn | 248—399 |
| 3,285,562 | 11/1966 | Langer | 248—378 |
| 3,304,044 | 2/1967 | Campbell et al. | 248—399 |
| 3,319,920 | 5/1967 | Freedman et al. | 248—399 |
| 3,325,136 | 6/1967 | Radke et al. | 248—400 |

FOREIGN PATENTS 910,582   2/1946   France.

MARION PARSONS, JR., Primary Examiner